US009721723B2

(12) United States Patent
Lohr et al.

(10) Patent No.: US 9,721,723 B2
(45) Date of Patent: Aug. 1, 2017

(54) HAND-HELD POWER TOOL RECHARGEABLE BATTERY HAVING MOLDED HOUSING PROJECTION

(71) Applicant: Robert Bosch GmbH, Stuttgart (DE)

(72) Inventors: Guenter Lohr, Leinfelden-Echterdingen (DE); Dragan Krupezevic, Stuttgart (DE); Juergen Mack, Goeppingen (DE); Jan Breitenbach, Stuttgart (DE); Marcin Rejman, Waiblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 118 days.

(21) Appl. No.: 14/654,169

(22) PCT Filed: Dec. 18, 2013

(86) PCT No.: PCT/EP2013/077134
§ 371 (c)(1),
(2) Date: Jun. 19, 2015

(87) PCT Pub. No.: WO2014/096031
PCT Pub. Date: Jun. 26, 2014

(65) Prior Publication Data
US 2015/0318734 A1    Nov. 5, 2015

(30) Foreign Application Priority Data

Dec. 21, 2012  (DE) .................. 10 2012 112 846
Feb. 1, 2013   (DE) .................. 10 2013 201 706
Dec. 17, 2013  (DE) .................. 10 2013 226 248

(51) Int. Cl.
*H01M 10/46*    (2006.01)
*H01F 38/14*    (2006.01)
(Continued)

(52) U.S. Cl.
CPC .......... *H01F 38/14* (2013.01); *H01M 2/1022* (2013.01); *H01M 2/1055* (2013.01);
(Continued)

(58) Field of Classification Search
CPC .......... H02J 7/025; H02J 7/355; H02J 7/0042; H02J 5/005
(Continued)

(56) References Cited

U.S. PATENT DOCUMENTS

2005/0221654 A1* 10/2005 Phillips ............... B25F 5/02
                                                    439/347
2009/0237194 A1  9/2009 Waffenschmidt et al.
2012/0146426 A1  6/2012 Sabo

FOREIGN PATENT DOCUMENTS

| CN | 102452069 A   | 5/2012 |
|----|---------------|--------|
| JP | 2005073350    | 3/2005 |
| JP | 2011034793 A  | 2/2011 |

OTHER PUBLICATIONS

International Search Report for PCT/EP2013/077134, dated Jun. 25, 2014.

* cited by examiner

*Primary Examiner* — Edward Tso
(74) *Attorney, Agent, or Firm* — Norton Rose Fulbright US LLP; Gerard Messina

(57) ABSTRACT

A hand-held power tool rechargeable battery is provided, including at least one rechargeable battery housing, at least one rechargeable battery cell and at least one inductive charging unit, which includes at least one inductive charging coil for charging the at least one rechargeable battery cell. It is provided that the rechargeable battery housing has at least one molded housing projection, which is delimited at least partially by an area of an inductive charging side of the rechargeable battery housing.

14 Claims, 7 Drawing Sheets

(51) Int. Cl.
  *H02J 7/00*   (2006.01)
  *H02J 7/02*   (2016.01)
  *H01M 2/10*   (2006.01)

(52) U.S. Cl.
  CPC ........... *H01M 10/46* (2013.01); *H02J 7/0042* (2013.01); *H02J 7/0044* (2013.01); *H02J 7/0045* (2013.01); *H02J 7/0052* (2013.01); *H02J 7/025* (2013.01); *H02J 7/027* (2013.01); *H01M 2220/30* (2013.01)

(58) Field of Classification Search
  USPC ................. 320/107, 108, 114, 115; 307/104; 429/96, 99, 100; D13/103, 104
  See application file for complete search history.

ND-HELD POWER TOOL
RECHARGEABLE BATTERY HAVING
MOLDED HOUSING PROJECTION

BACKGROUND INFORMATION

A hand-held power tool rechargeable battery, including at least one rechargeable battery housing, at least one rechargeable battery cell and at least one inductive charging unit, which includes at least one inductive charging coil for charging the at least one rechargeable battery cell, has already been provided.

SUMMARY

The present invention is directed to a hand-held power tool rechargeable battery, including at least one rechargeable battery housing, at least one rechargeable battery cell and at least one inductive charging unit, which includes at least one inductive charging coil for charging the at least one rechargeable battery cell.

It is provided that the rechargeable battery housing includes at least one molded housing projection, which is delimited at least partially by an area of an inductive charging side of the rechargeable battery housing. A "hand-held power tool rechargeable battery" is intended to mean, in particular, a device, including at least one rechargeable battery cell and electronics for charging and discharging the rechargeable battery cell, the device being provided to supply at least one hand-held power tool with electrical energy. The hand-held power tool rechargeable battery is preferably provided for releasably coupling to the hand-held power tool by an operator, in particular, without the use of tools. Alternatively, the hand-held power tool rechargeable battery could be integrated into the hand-held power tool. A "hand-held power tool" in this context is intended to mean, in particular, an electrical device hand-operated by a user, such as, in particular, a power drill, a drill hammer, a saw, a plane, a screwdriver, a milling tool, a grinder, an angle grinder, a multi-functional tool, a construction site measuring device and/or a garden tool, such as a hedge trimmer, shrub and/or grass shears. A "rechargeable battery housing" is intended to mean, in particular, a component or a module, which is provided to protect at least the inductive charging unit and the rechargeable battery cells against mechanical damage and/or contamination from the surroundings. The rechargeable battery housing defines, in particular, a shape and a size of the hand-held power tool rechargeable battery. The rechargeable battery housing preferably has a fastening device for fastening the hand-held power tool rechargeable battery to the hand-held power tool. The rechargeable battery housing advantageously includes contact recesses, through which an electrical contact may be established between the hand-held power tool and at least the rechargeable battery cell. A "rechargeable battery cell" is intended to mean, in particular, a means, which is provided for an electrochemical storage of electrical energy with the aid of a reversible reaction. The rechargeable battery cell may be formed, for example, by a lead rechargeable battery cell, a NiCd-rechargeable battery cell, a NiMH-rechargeable battery cell, preferably, however, by a lithium-based rechargeable battery cell. The rechargeable battery cells may have different nominal voltages, for example, nominal voltages of 1.2 V, 1.5 V or advantageously approximately 3.6 V. The rechargeable battery cells preferably have a cylindrical shape, other shapes appearing meaningful to those skilled in the art also being possible. The hand-held power tool rechargeable battery advantageously includes multiple rechargeable battery cells, for example, at least two, three, four, five or ten. The rechargeable battery cells are connected, in particular, in parallel and/or in series. An "inductive charging unit" is intended to mean, in particular, a unit for charging the rechargeable battery cells, which receives a charging current via induction, and which includes at least the inductive charging coil and inductive charging electronics. The inductive charging unit preferably also includes at least one coil core for increasing an inductance of the at least one inductive charging coil. The inductive charging unit advantageously includes a coil carrier, which positions the inductive charging coil relative to the coil core. The inductive charging unit is advantageously provided for communicating with an inductive charger of the inductive charging device for the purpose of controlling the charge and, in particular, for detecting foreign objects. An "inductive charging coil" in this context is intended to mean, in particular, a coil having at least one winding made of an electrically conductive material, which is provided to receive in at least one operating state an electrical energy which is transferred during a charging operation from an inductive charging coil of an inductive charger, and to feed it via the inductive charging electronics to a rechargeable battery cell. The inductive charging coil is provided, in particular, to convert an electromagnetic alternating field into an electric alternating current and/or vice versa. The alternating field preferably has a frequency of 10 kHz-500 kHz, particularly preferably of 100 kHz-120 kHz. A "charging" is intended to mean, in particular, a process, in which energy is transferred inductively from the inductive charger to the hand-held power tool rechargeable battery.

A "molded housing projection" is intended to mean, in particular, a shaping area of the rechargeable battery housing, which deviates from a basic shape. In particular, the molded housing projection is advantageously completely firmly connected to a rest of the rechargeable battery housing. The molded housing projection is particularly advantageously designed, in particular, fully integrated, with the rest of the rechargeable battery housing. "At least partially" is intended to mean, in particular, that at least 10%, advantageously at least 25%, of the outer sides of the molded housing projection lie at least essentially in one plane, which is spanned by the inductive charging side. "At least essentially" in this context is intended to mean, in particular, by less than 5 mm, advantageously less than 2 mm, away. An "inductive charging side" is intended to mean, in particular, an outer side of the rechargeable battery housing, through which the inductive charging coil receives the magnetic energy. The inductive charging side is, in particular, aligned perpendicularly to a winding axis of the inductive charging coil, and is situated nearest the inductive charging coil. An "area of an inductive charging side" is intended to mean, in particular, a subarea of the area forming the inductive charging side. The term "delimit" is intended to mean, in particular, that the subarea of the area forming the inductive charging side forms an outer side of the molded housing projection. "Shaping" in this context is intended to mean, in particular, that the molded housing projection substantially influences an outer shape of the hand-held power tool rechargeable battery. The molded housing projection preferably has a volume deviating from a basic shape of the rechargeable battery housing, which is more than 1 cm$^3$, particularly advantageously more than 2 cm$^3$. At least one outer side of the molded housing projection is advantageously situated spaced apart by more than 0.5 mm, advantageously more than 1.5 mm, particularly advantageously more than 4 mm from a parallel main outer side of the rechargeable battery housing in a direction perpendicular to the main outer side. A "main outer side" is intended to mean, in particular, an outer surface of the hand-held power tool rechargeable battery, which is curved less than 30 degrees, and which includes a total of more than 10% of a total outer surface of the hand-held power tool rechargeable battery.

A particularly stable stand on the inductive charging side may be achieved by the embodiment of the hand-held power tool rechargeable battery according to the present invention In another embodiment, it is suggested that the molded housing projection is provided for fastening to an inductive charging device the molded housing projection, as a result of which an unintended movement of the hand-held power tool rechargeable battery may be advantageously avoided during a charging operation. The molded housing projection is preferably provided to absorb a force, which arranges at least the rechargeable battery housing relative to the inductive charging device. The molded housing projection is preferably designed as a passive molded housing projection, which means, in particular, that the molded housing projection remains stationary relative to the inductive charging coil during a fastening process. Alternatively, the molded housing projection could be at least partially deflected during the fastening process. A "fastening" is intended to mean, in particular, that in order to separate the hand-held power tool rechargeable battery from the inductive charging device during a charging operation, a force applied to the hand-held power tool rechargeable battery and the inductive charging device is required, which is greater than a weight force of the hand-held power tool rechargeable battery. An "inductive charging device" is intended to mean, in particular, a device which includes at least one inductive charger and advantageously one fastening device. The fastening device is at least provided, in particular, to fasten the hand-held power tool rechargeable battery to the inductive charger.

It is also provided that the molded housing projection is designed as a first molded housing projection, which is provided for fastening in a direction parallel to a winding axis of the inductive charging coil, or designed as a second molded housing projection, which is provided for fastening in at least one direction perpendicular to the winding axis of the inductive charging coil, as a result of which an advantageous arrangement or an advantageous fastening of the hand-held power tool rechargeable battery during a charging operation may be achieved. A "winding axis" is intended to mean, in particular, a straight line, which is aligned in parallel to a direction of the magnetic field lines in a center point of the inductive charging coil. The winding axis is aligned, in particular, perpendicularly to a main extension plane of the inductive charging coil. The windings of the inductive charging coil run, in particular, tangentially to the winding axis. The phrase "fastening in a direction parallel to the winding axis" is intended to mean, in particular, that the first molded housing projection is provided to effectuate a fastening force, which presses a rest of the hand-held power tool rechargeable battery toward the inductive charging coil of the inductive charger. The phrase "in a direction perpendicular to a winding axis" is intended to mean, in particular, that the second molded housing projection is provided to effectuate a positioning force on a rest of the hand-held power tool rechargeable battery, which counteracts a lateral displacement of the hand-held power tool rechargeable battery relative to the inductive charger.

It is further provided that the rechargeable battery housing includes the first molded housing projection and the second molded housing projection, as a result of which an unintentional movement of the hand-held power tool rechargeable battery may be particularly reliably avoided during a charging operation. Alternatively, the rechargeable battery housing could include only the first molded housing projection, or only the second molded housing projection. The wording "the first" and "the second" are used merely to differentiate the means and does not represent any prioritization or sequence.

It is also provided that the inductive charging coil is situated at least partially within the first molded housing projection, as a result of which an advantageously large coil diameter may be achieved in a space-saving manner. The phrase "situated at least partially within" is intended to mean, in particular, that at least one point of the coil is enclosed by the molded housing projection. In particular, at least one plane, which is spanned by the main outer side of the rechargeable battery housing, intersects the inductive charging coil.

In addition, it is provided that the first molded housing projection includes at least one first fastening area and one second fastening area, which are situated on opposite sides of an inductive charging side of the rechargeable battery housing, as a result of which a stable fastening is possible in a structurally simple manner. A "fastening area" is intended to mean, in particular, a cohesive area which is directly acted upon by a fastening force. In addition, the molded housing projection could include at least one additional fastening area. Advantageously, however, the first molded housing projection is made up of exactly the two fastening areas. The first fastening area and the second fastening area are, in particular, situated spaced apart from one another. The phrase "situated on opposite sides" is intended to mean, in particular, that a center point of the inductive charging side is situated between the two fastening areas.

It is further provided that the first fastening area and/or the second fastening area is/are formed as receiving shoulders, as a result of which a fastening may be particularly advantageously implemented. A "receiving shoulder" is intended to mean, in particular, an elongated molding projecting beyond a basic shape of the rechargeable battery housing. A depth and a width perpendicular to a main extension direction of the receiving shoulder differ preferably by less than 50%.

In one advantageous embodiment of the present invention, it is suggested that the second molded housing projection is provided for positioning at least the inductive charging coil for the charging, as a result of which a particularly effective energy transfer is possible. The term "to position" is intended to mean, in particular, that the second molded housing projection determines an arrangement of the inductive charging coil of the hand-held power tool rechargeable battery relative to the inductive charging coil of the inductive charger in at least one operating state.

In addition, it is provided that the second molded housing projection includes at least one form-locking surface, which extends at least essentially along a lateral surface, as a result of which an advantageous positioning is possible in a structurally simple manner. A "form-locking surface" is intended to mean, in particular, a surface, which is provided for establishing a form-locking connection between the hand-held power tool rechargeable battery and the inductive charger. The molded housing projection delimits, in particular, a cylindrical area, or the molded housing projection advantageously has an at least partially cylindrical design. The molded housing projection is advantageously molded on to the rechargeable battery housing. The phrase "extends along a lateral surface" is intended to mean, in particular, that the form-locking surface has a profile, which corresponds at least essentially to a lateral surface of a cylinder.

It is further provided that the second molded housing projection includes a foreign body receiving recess, which is provided for reducing an induction charging space, as a result of which a negative effect of, in particular, non-magnetic foreign bodies may be minimized. A "foreign body receiving recess" is intended to mean, in particular, an area delimited by the molded housing projection, which is provided for accommodating foreign bodies, which are situated between the hand-held power tool rechargeable battery and the inductive charger during a charging operation. A "reduction" is intended to mean, in particular, that, as a result of the accommodation of the foreign bodies, the induction charging space in at least one operating state is less than without the foreign body receiving recess. An "induction charging space" is intended to mean, in particular, a space between the inductive charging coil of the hand-held power tool rechargeable battery and the inductive charging coil of the inductive charger.

In addition, the present invention is directed to a system including a hand-held power tool rechargeable battery and an inductive charging device according to the present invention.

In addition, it is suggested that the inductive charging device includes at least one first fastening means, which is provided for fastening the first molded housing projection of the hand-held power tool rechargeable battery in a force-locking manner and/or form-locking manner, as a result of which an advantageous fastening in a structurally simple manner is possible. The term "fastening in a force-locking manner" is intended to mean, in particular, that the first fastening means of the inductive charging device effectuates a force on a first molded housing projection of the hand-held power tool rechargeable battery, the force causing a friction, which fastens the hand-held power tool rechargeable battery relative to the inductive charger. The term "fastening in a form-locking manner" is intended to mean, in particular, that the first fastening means of the inductive charging device has a shape, which prevents a movement of the hand-held power tool rechargeable battery relative to the inductive charger.

It is further suggested that the inductive charging device includes at least one second fastening means, which is provided for positioning the hand-held power tool rechargeable battery for the charging with the aid of its first molded housing projection, as a result of which a particularly effective charge may be achieved. The phrase "with the aid of its molded housing projection" is intended to mean, in particular, that the second fastening means of the inductive charging device and the second molded housing projection of the hand-held power tool rechargeable battery are provided to interact for positioning the hand-held power tool rechargeable battery.

In addition, it is also provided that the second molded housing projection of the hand-held power tool rechargeable battery and the second fastening means of the inductive charging device have basic shapes, which differ from one another, as a result of which the second molded housing projection of the hand-held power tool rechargeable battery and the second fastening means may be connected to one another with an advantageous feel. "Basic shapes which differ from one another" is intended to mean, in particular, that the second molded housing projection of the hand-held power tool rechargeable battery and the second fastening means of the inductive charging device have two different geometric shapes.

The system according to the present invention and its components according to the present invention are not intended in this case to be limited to the use and specific embodiment described above. The system according to the present invention and its components according to the present invention may include a number of individual elements, components and units differing from a number cited herein for achieving a functionality described herein.

DETAILED DESCRIPTION

Figure 1:
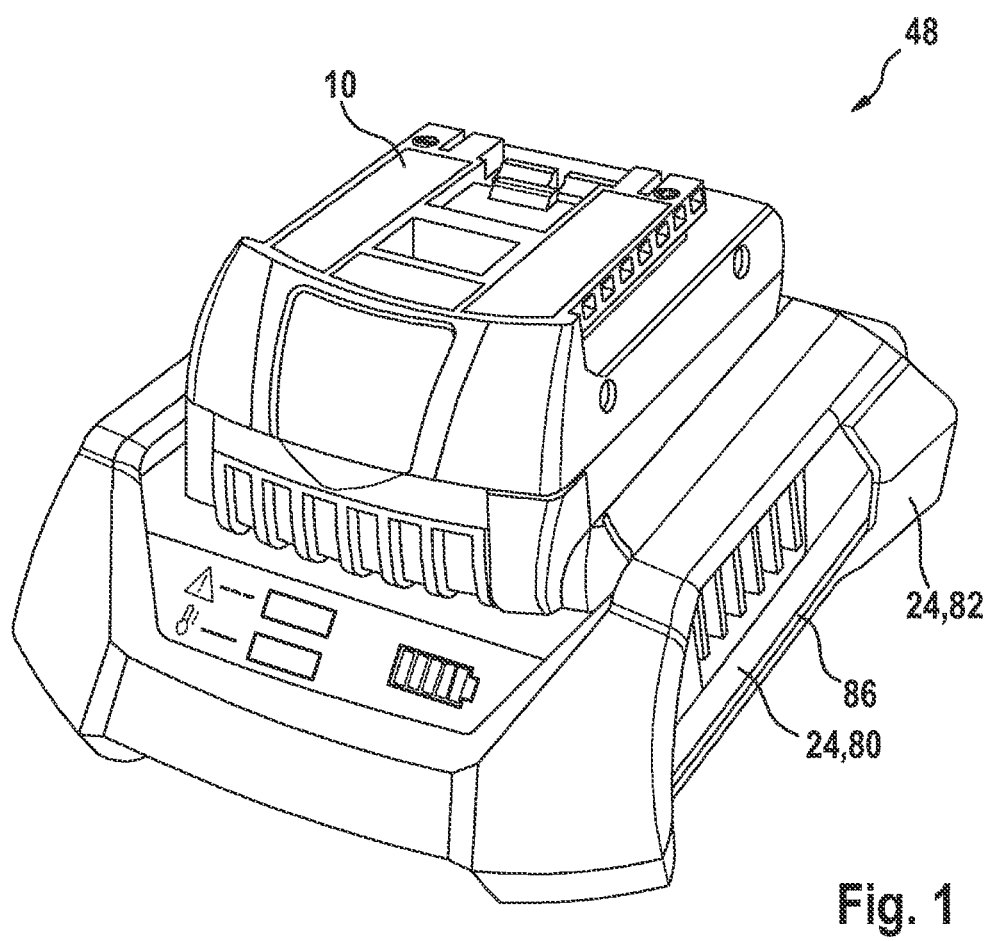
FIG. 1 shows a system including a hand-held power tool rechargeable battery according to the present invention, and an inductive charging device.
Figure 2:
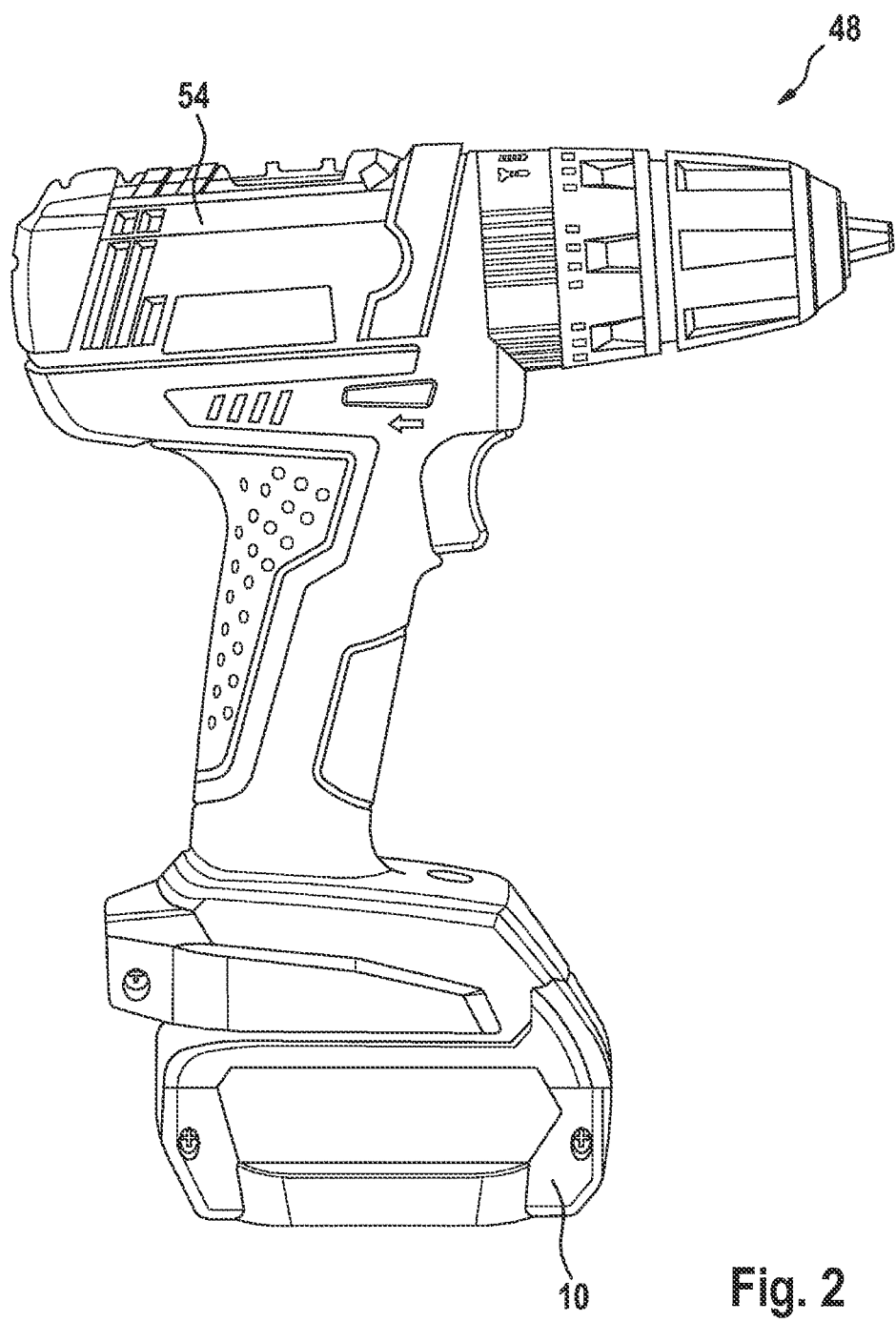
FIG. 2 shows a hand-held power tool and the hand-held power tool rechargeable battery of the system from FIG. 1.
Figure 3:
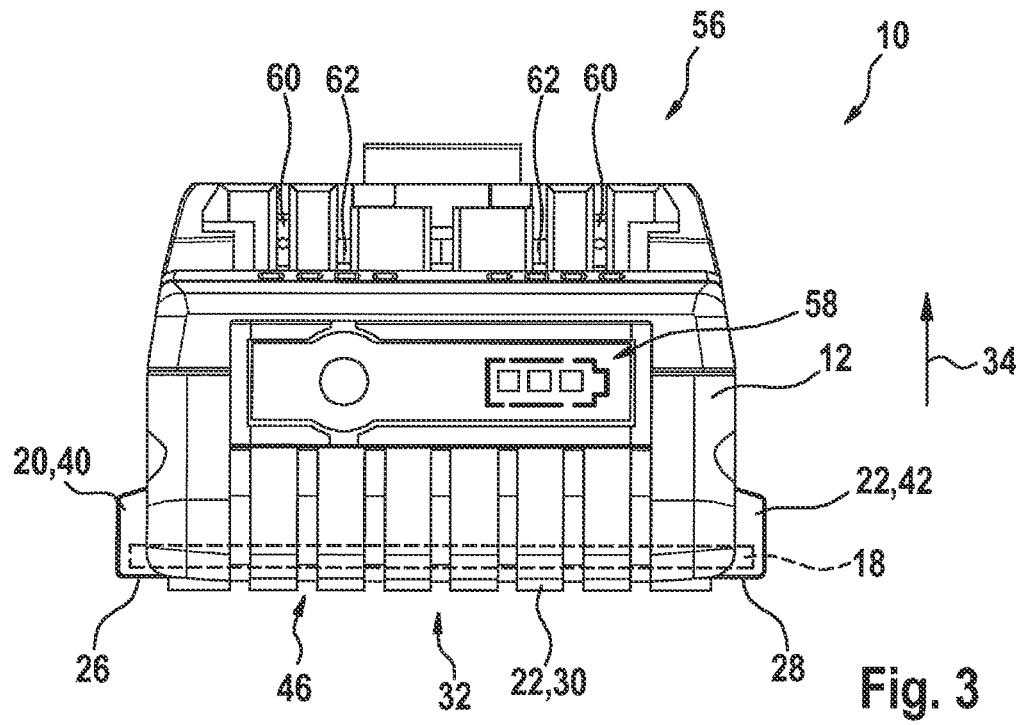
FIG. 3 shows a front view of the hand-held power tool rechargeable battery from FIG. 1.
Figure 4:
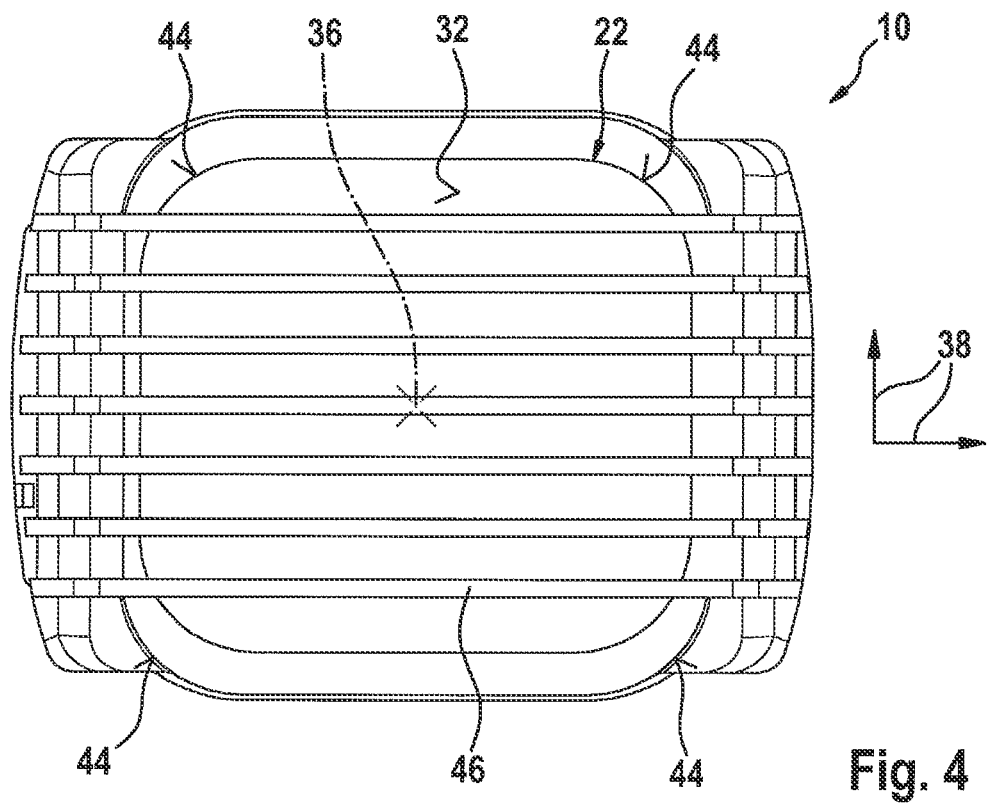
FIG. 4 shows a view of an inductive charging side of the hand-held power tool rechargeable battery from FIG. 1.
Figure 5:
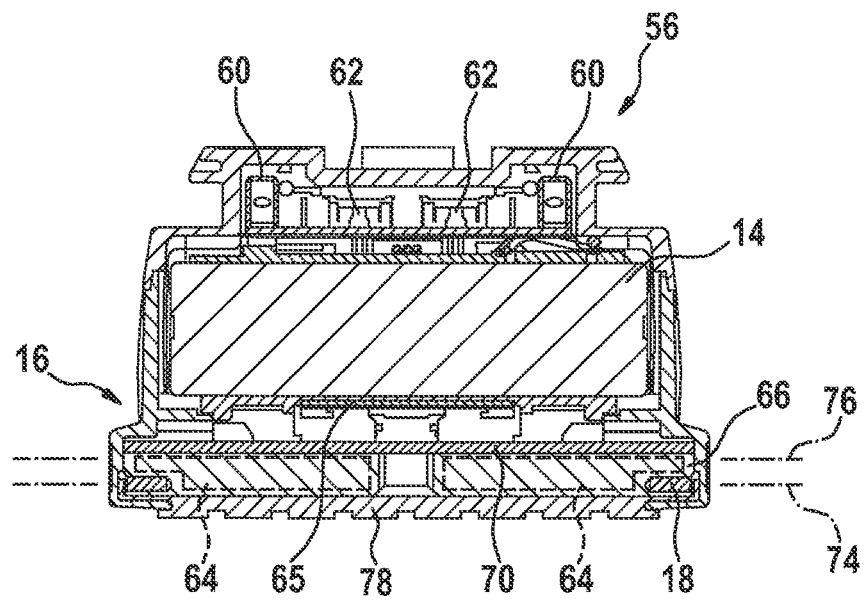
FIG. 5 shows a first section of the hand-held power tool rechargeable battery from FIG. 1.
Figure 6:
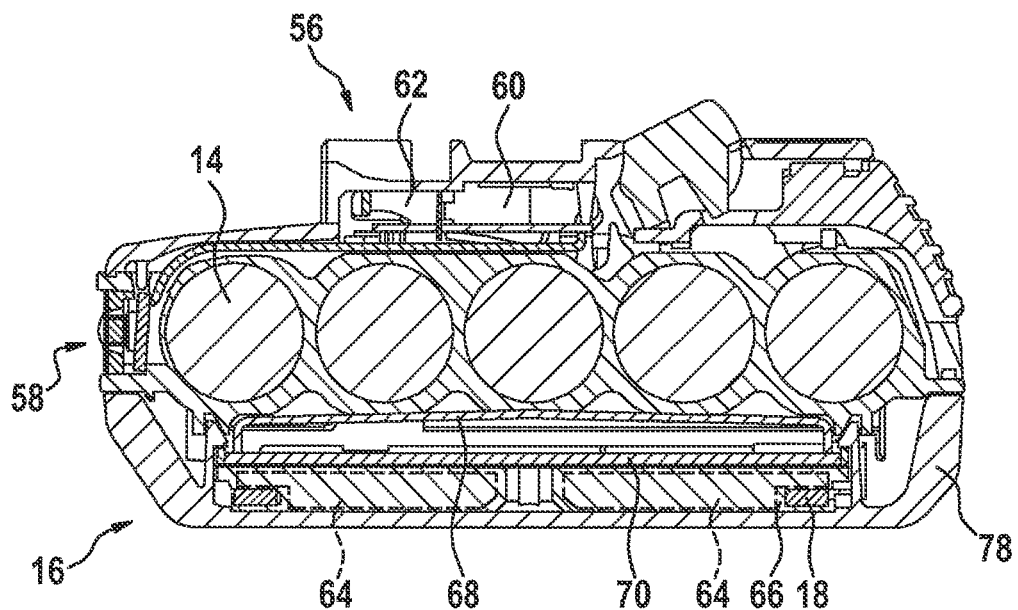
FIG. 6 shows a second section of the hand-held power tool rechargeable battery from FIG. 1.

FIGS. 1 and 2 show a system 48 according to the present invention, including a hand-held power tool rechargeable battery 10, an inductive charging device 24 and a hand-held power tool 54. The hand-held power tool rechargeable battery 10 is provided for supplying hand-held power tool 54 with electrical operating energy. Inductive charging device 24 is provided for inductively charging hand-held power tool rechargeable battery 10. Hand-held power tool 54 is designed as a hand-held power tool, in this case as a screw drill.

FIGS. 3 through 6 show hand-held power tool rechargeable battery 10. Hand-held power tool rechargeable battery 10 includes a rechargeable battery housing 12, multiple rechargeable battery cells 14, an inductive charging unit 16, a hand-held power tool interface 56 and a charge state display 58. Charge state display 58 is provided for displaying a charge state of rechargeable battery cells 14 to an operator. Hand-held power tool interface 56 is provided for mechanically and electrically contacting hand-held power tool 54. During an operation of hand-held power tool 54, hand-held power tool rechargeable battery 10 supplies an operating energy of hand-held power tool 54. Hand-held power tool interface 56 is situated on a side, which is situated facing away from an inductive charging side 32 of rechargeable battery housing 12, specifically, the side is situated opposite inductive charging side 32. Hand-held power tool interface 56 includes contacts 60 for transferring energy and contacts 62 for communicating.

Figure 7:
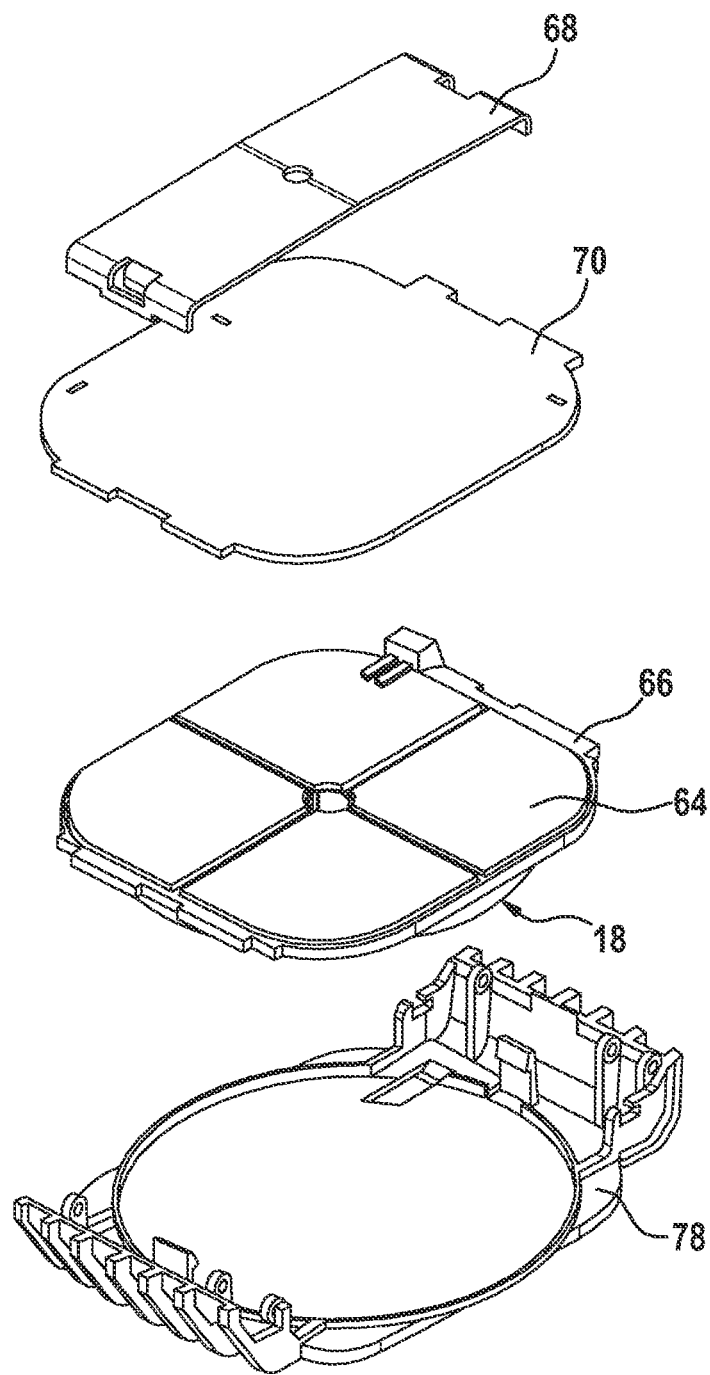
FIG. 7 shows an inductive charging unit of the hand-held power tool rechargeable battery from FIG. 1 in a perspective exploded view.

Inductive charging unit 16 depicted in FIG. 7 includes an inductive charging coil 18, a coil core 64, a coil carrier 66, a heat compensation means 68 and inductive charging electronics 70. Inductive charging electronics 70 are provided for controlling the charging operation of rechargeable battery cell 14. Inductive charging electronics 70 includes a circuit board having a placement on a side facing away from inductive charging coil 18 and a shielding surface on a side facing toward inductive charging coil 18. Heat compensation means 68 is provided for distributing the heat emanating from inductive charging electronics 70 uniformly to rechargeable battery cells 14. Inductive charging coil 18 receives electrical energy for charging rechargeable battery cells 14.

Coil carrier 66 is provided for situating coil core 64 and inductive charging coil 18 relative to one another. Inductive charging coil 18 is wound on coil carrier 66. Inductive charging coil 18 encloses coil core 64 on one plane. Coil core 64 is made of a ferromagnetic material, specifically, of a ferrite. Coil core 64 has a multi-part design, in this case specifically a four-part design. Coil core 64 includes multiple subparts in the shape of pizza slices. Coil core 64 widens in the direction of rechargeable battery cells 14 as viewed from a coil plane 74. Coil core 64 includes a largest areal extension 76 on a plane between coil plane 74 and inductive charging electronics 70. This areal extension 76 includes an area larger than inductive charging coil 18 on coil plane 74.

Inductive charging unit 16 has a housing part 78 of rechargeable battery housing 12. Housing part 78 delimits hand-held power tool rechargeable battery 10 on the side facing away from hand-held power tool interface 56. Housing part 78 connects the other components to form a module. Inductive charging unit 16 as a module is electronically tested separately from a rest of hand-held power tool rechargeable battery 10.

Rechargeable battery housing 12 includes a first molded housing projection 20 and a second molded housing projection 22. Molded housing projections 20, 22 are provided for fastening hand-held power tool rechargeable battery 10 to inductive charging device 24 during a charging operation. Inductive charging side 32 of rechargeable battery housing 12 delimits areas 26, 28 of first molded housing projection 20 and an area 30 of second molded housing projection 22. An outer area of first molded housing projection 20 and an outer area of second molded housing projection 22, in particular, each form a part of inductive charging side 32.

First molded housing projection 20 is provided for fastening in a direction 34 parallel to winding axis 36 of inductive charging coil 18. First molded housing projection 20 has a first fastening area 40 and a second fastening area 42, which are situated on opposite sides of inductive charging side 32 of rechargeable battery housing 12. Fastening areas 40, 42 have a wing-shaped design. Fastening areas 40, 42 are designed as receiving shoulders. Fastening areas 40, 42 have a rail-like shape. Inductive charging coil 18 is situated partially within fastening areas 40, 42. Situated as functional components, specifically, as electrical functional components, within fastening areas 40, 42, are merely inductive charging coil 18, coil core 64 and inductive charging electronics 70.

Second molded housing projection 22 is provided for fastening in two directions 38 perpendicular to winding axis 36 of inductive charging coil 18 and, therefore, for positioning inductive charging coil 18 of hand-held power tool rechargeable battery 10 relative to inductive charging device 24 for the charging. Second molded housing projection 22 is designed as a large-area molded projection on inductive charging side 32 of rechargeable battery housing 12. Second molded housing projection 22 has an extension parallel to winding axis 36 of inductive charging coil 18 between 0.5 mm and 2 mm, in this case, an extension of 1.2 mm. Second molded housing projection 22 has a rectangular basic shape with rounded corners. Form-locking surfaces 44 of second molded housing projection 22 extend along lateral surfaces, the axes of which are aligned in parallel to those of winding axis 36.

Second molded housing projection 22 includes foreign body receiving recesses 46, which are provided for reducing an induction charging space between inductive charging coil 18 of hand-held power tool rechargeable battery 10 and inductive charging device 24, when foreign bodies are situated between hand-held power tool rechargeable battery 10 and inductive charging coil 24. Foreign body receiving recesses 46 are designed as slots delimited by second molded housing projection 22. Foreign body receiving recesses 46 have a depth of between 0.7 mm and 1.5 mm, specifically in this case, of 1 mm. In this case, foreign body receiving recesses 46 have a linear profile. Alternatively, foreign body receiving recesses 46 could have another profile appearing meaningful to those skilled in the art, for example, partially circular subprofiles.

Figure 8:
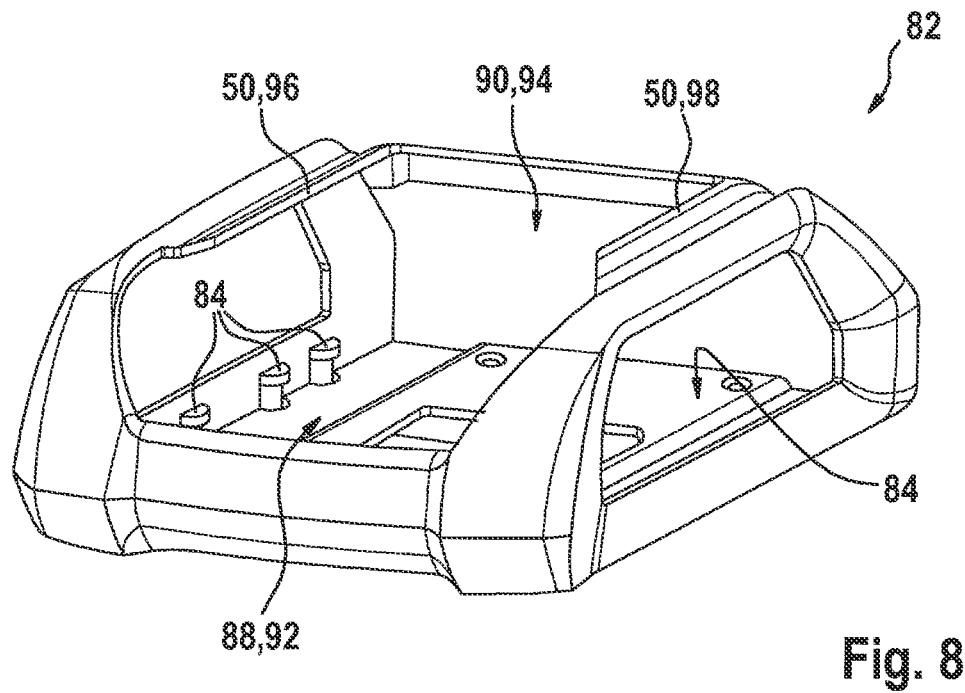
FIG. 8 shows a fastening device of the inductive charging device from FIG. 1.
Figure 9:
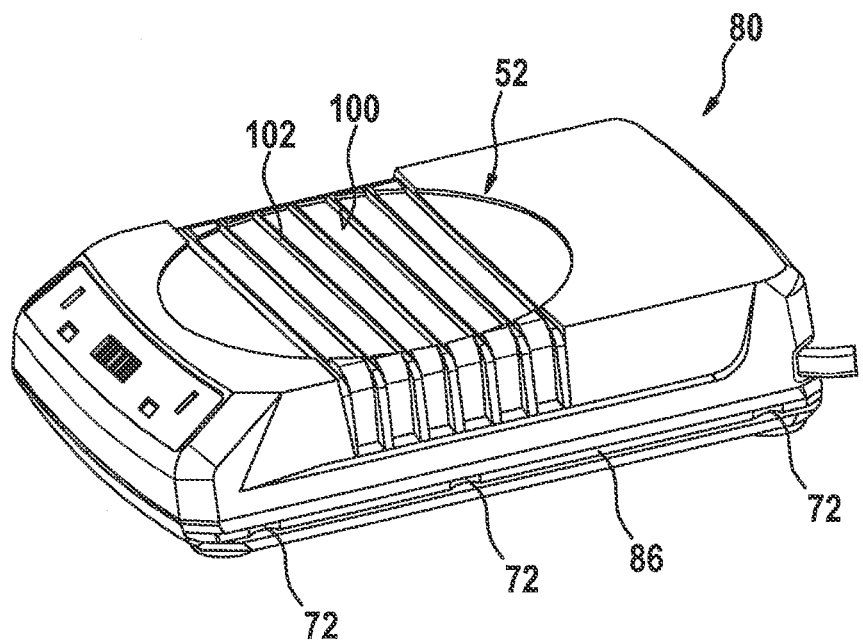
FIG. 9 shows an inductive charger of the inductive charging device from FIG. 1.

Inductive charging device 24 includes an inductive charger 80 depicted in FIG. 9, and a fastening device 82 depicted in FIG. 8. Inductive charger 80 includes charging electronics and an inductive charging coil, not further depicted herein. The charging electronics of inductive charger 80 are provided for generating an alternating voltage, the energy of which is transferred by the inductive charging coil to hand-held power tool rechargeable battery 10 during a charging operation.

Fastening device 82 has a frame-like design. Fastening device 82 includes coupling means 84, which are provided for mechanically coupling with coupling means 86 of inductive charger 80. Coupling means 86 of inductive charger 80 are designed as grooves. Coupling means 86 include indentations 72 for form-locking fastening. Coupling means 84 of fastening device 82 are designed as molded projections, which are provided for tracking in the grooves. Coupling means 84 of fastening device 82 are spring-loaded. Coupling means 84 of fastening device 82 fasten inductive charger 80 in a force-locking manner. Alternatively or in addition, coupling means 84 of fastening device 82 could fasten inductive charger 80 in a form-locking manner.

Fastening device 82 includes a first receiving slot 88, via which hand-held power tool rechargeable battery 10 is insertable by the operator in fastening device 82 without the use of tools. Fastening device 82 includes a second receiving slot 90, via which inductive charger 80 is insertable by the operator in fastening device 82 without the use of tools. Hand-held power tool rechargeable battery 10 and inductive charger 80 are insertable in fastening device 82 from different sides 92, 94, specifically, from opposite sides 92, 94.

Fastening device 82 is provided for fastening hand-held power tool rechargeable battery 10 to inductive charger 80 during the charging operation. For this purpose, fastening device 82 includes a first fastening means 50 of inductive charging device 24. Fastening means 50 of fastening device 82 includes a first fastening area 96 and a second fastening area 98, which are provided for fastening first molded housing projection 20 of hand-held power tool rechargeable battery 10 in a force-locking and form-locking manner. For this purpose, fastening areas 96, 98 of fastening means 50 of fastening device 82 press hand-held power tool rechargeable battery 10 against inductive charger 80. First fastening area 96 and second fastening area 98 have a rail-shaped design.

Fastening device 82 is slightly deformed during an insertion of hand-held power tool rechargeable battery 10.

Inductive charger 80 of inductive charging device 24 includes a second fastening means 52 of inductive charging device 24. Second fastening means 52 of inductive charging device 24 is provided for positioning hand-held power tool rechargeable battery 10 for the charging with the aid of its second molded housing projection 22. Second fastening means 52 of inductive charging device 24 is designed as an indentation having a circular basic shape within an inductive charging side 100 of inductive charger 80. Thus, second molded housing projection 22 of hand-held power tool rechargeable battery 10 and second fastening means 52 of inductive charging device 24 have basic shapes which differ from one another. Second molded housing projection 22 of hand-held power tool rechargeable battery 10 and second fastening means 52 of inductive charging device 24 have an identical extension in at least two directions.

Fastening means 52 includes foreign body receiving recesses 102, which are provided for reducing an induction charging space between inductive charging coil 18 of hand-held power tool rechargeable battery 10 and inductive charging device 24, when foreign bodies are situated between hand-held power tool rechargeable battery 10 and inductive charging device 24. Foreign body receiving recesses 102 have a depth of between 0.5 mm and 1.5 mm, in this case specifically of 1 mm. In this case, foreign body receiving recesses 102 have a linear profile. Alternatively, foreign body receiving recesses 102 could have another profile appearing meaningful to those skilled in the art, for example, partially circular subprofiles. Foreign body receiving recesses 102 extend up to sides adjacent to inductive charging side 100 and are designed there as open. Thus, foreign bodies may migrate through foreign body receiving recesses 102 from an area between rechargeable hand-held power tool 10 and inductive charger 80, for example, as a result of vibrations in a motor vehicle.

Figure 10:
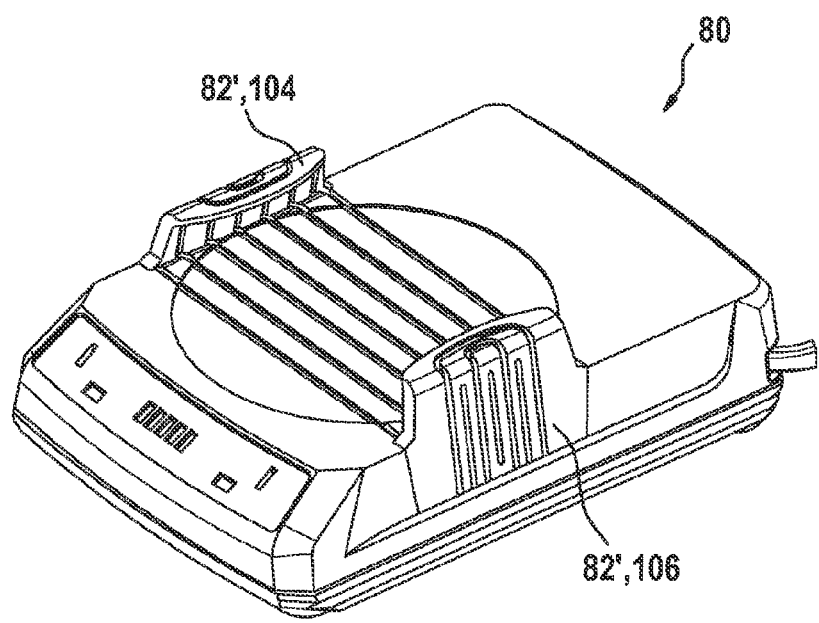
FIG. 10 shows an alternative or additional fastening device of the inductive charging device from FIG. 1.

FIG. 10 shows another fastening device 82' of an alternative or additional exemplary embodiment of fastening device 82 from FIGS. 1 and 8. Additional fastening device 82' includes two fastening elements 104, 106 designed separately from one another. The two fastening elements 104, 106 have an ear-shaped design. Fastening elements 104, 106 are attached in foreign body receiving recesses 102 of inductive charger 80. Fastening elements 104, 106 have a partially elastic design, as a result of which an avoidance of damage to fastening elements 104, 106 by an independent release of fastening elements 104, 106 may be achieved.

What is claimed is:

1. A hand-held power tool rechargeable battery, comprising:
   at least one rechargeable battery housing;
   at least one rechargeable battery cell; and
   at least one inductive charging unit that includes at least one inductive charging coil for charging the at least one rechargeable battery cell, wherein the rechargeable battery housing includes at least two molded housing projections that are delimited at least partially by an area of an inductive charging side of the rechargeable battery housing, wherein a first molded housing projection fastens in a direction parallel to a winding axis of the inductive charging coil, and a second molded housing projection fastens in at least one direction perpendicular to the winding axis of the inductive charging coil.

2. The hand-held power tool rechargeable battery as recited in claim 1, wherein the molded housing projection fastens to an inductive charging device.

3. The hand-held power tool rechargeable battery as recited in claim 1, wherein the rechargeable battery housing includes the first molded housing projection and the second molded housing projection.

4. The hand-held power tool rechargeable battery as recited in claim 1, wherein the inductive charging coil is situated at least partially within the first molded housing projection.

5. The hand-held power tool rechargeable battery as recited in claim 1, wherein the first molded housing projection includes at least one first fastening area and one second fastening area, the first and second fastening areas being situated on opposite sides of an inductive charging side of the rechargeable battery housing.

6. The hand-held power tool rechargeable battery as recited in claim 5, wherein at least one of the first fastening area and the second fastening area is designed as a receiving shoulder.

7. The hand-held power tool rechargeable battery as recited in claim 1, wherein the second molded housing projection positions at least the inductive charging coil for a charging.

8. The hand-held power tool rechargeable battery as recited in claim 1, wherein the second molded housing projection includes at least one form-locking surface that extends at least essentially along a lateral surface.

9. The hand-held power tool rechargeable battery as recited in claim 1, wherein the second molded housing projection includes at least one foreign body receiving recess that reduces an induction charging space.

10. A system, comprising:
    an inductive charging device; and
    a hand-held power tool rechargeable battery, including:
      at least one rechargeable battery housing;
      at least one rechargeable battery cell; and
      at least one inductive charging unit that includes at least one inductive charging coil for charging the at least one rechargeable battery cell, wherein the rechargeable battery housing includes at least two molded housing projections that are delimited at least partially by an area of an inductive charging side of the rechargeable battery housing, wherein a first molded housing projection fastens in a direction parallel to a winding axis of the inductive charging coil, and a second molded housing projection fastens in at least one direction perpendicular to the winding axis of the inductive charging coil.

11. The system as recited in claim 10, wherein the inductive charging device includes at least one fastening arrangement for fastening the molded housing projection of the hand-held power tool rechargeable battery at least one of in a force-locking manner and a form-locking manner.

12. The system as recited in claim 10, wherein the inductive charging device includes at least one fastening arrangement for positioning the hand-held power tool rechargeable battery for the charging with the aid of the molded housing projection.

13. The system as recited in claim 12, wherein the molded housing projection of the hand-held power tool rechargeable battery and the second fastening arrangement of the inductive charging device have basic shapes which differ from one another.

14. A hand-held power tool rechargeable battery, comprising:

at least one rechargeable battery housing;
at least one rechargeable battery cell; and
at least one inductive charging unit that includes at least one inductive charging coil for charging the at least one rechargeable battery cell, wherein the rechargeable battery housing includes at least one molded housing projection that is delimited at least partially by an area of an inductive charging side of the rechargeable battery housing,
wherein the molded housing projection is one of:
 a first molded housing projection that fastens in a direction parallel to a winding axis of the inductive charging coil, and
 a second molded housing projection that is fastens in at least one direction perpendicular to the winding axis of the inductive charging coil,
 wherein the second molded housing projection includes at least one foreign body receiving recess that reduces an induction charging space.

\* \* \* \* \*